(12) United States Patent
Ito et al.

(10) Patent No.: US 9,130,501 B2
(45) Date of Patent: Sep. 8, 2015

(54) CONTROL DEVICE FOR ROTARY MACHINE

(75) Inventors: Masato Ito, Tokyo (JP); Toshio Morohoshi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 117 days.

(21) Appl. No.: 14/117,770

(22) PCT Filed: Jun. 27, 2011

(86) PCT No.: PCT/JP2011/064708
§ 371 (c)(1),
(2), (4) Date: Nov. 14, 2013

(87) PCT Pub. No.: WO2013/001596
PCT Pub. Date: Jan. 3, 2013

(65) Prior Publication Data
US 2014/0084822 A1    Mar. 27, 2014

(51) Int. Cl.
*H02P 6/00* (2006.01)
*H02P 21/14* (2006.01)
*H02P 6/18* (2006.01)
*H02P 21/00* (2006.01)

(52) U.S. Cl.
CPC ............ *H02P 21/146* (2013.01); *H02P 6/185* (2013.01); *H02P 6/186* (2013.01); *H02P 21/0053* (2013.01); *H02P 2203/03* (2013.01)

(58) Field of Classification Search
CPC ............................... H02P 21/14; H02P 21/146
USPC ............ 318/400.01, 400.02, 400.1, 400.12, 318/400.14, 400.15, 400.32, 700, 701, 715, 318/721, 725, 727, 779, 799, 800, 801, 805, 318/808, 809, 810, 811, 812, 254.1, 265, 318/430, 432
See application file for complete search history.

(56) References Cited

U.S. PATENT DOCUMENTS 6,281,656 B1 *   8/2001   Masaki et al. ................ 318/700
2001/0009359 A1   7/2001   Kinpara et al.
(Continued)

FOREIGN PATENT DOCUMENTS

JP   2008 54430   3/2008
JP   4271397      3/2009
(Continued)

OTHER PUBLICATIONS

International Search Report Issued Sep. 27, 2011 in PCT/JP11/064708 Filed Jun. 27, 2011.

*Primary Examiner* — Antony M Paul
(74) *Attorney, Agent, or Firm* — Oblon, McClelland, Maier & Neustadt, L.L.P.

(57) ABSTRACT

A storage section stores, as stored current values, currents flowing when a voltage application section applies voltage vectors to a three-phase rotary machine. A position estimation section estimates the rotor position of the rotary machine in a stopped state based on the stored current values. An adjustment section adjusts a minimum necessary application time that allows the rotary machine to be magnetically saturated by voltage vector application, to enable rotor position estimation. Further, the adjustment section uses, as an adjustment evaluation value, the magnitude $|\Delta Y|$ of differential admittance obtained by dividing a summed current value calculated from the stored current values by the voltage amplitude value of the voltage vector instruction when the voltage vector based on the voltage vector instruction is applied with the application time being set at an arbitrary application time, and adjusts the application time based on $|\Delta Y|$.

11 Claims, 9 Drawing Sheets

(56) References Cited

U.S. PATENT DOCUMENTS

2003/0102839 A1 6/2003 Kinpara et al.
2010/0194319 A1 8/2010 Ito et al.

FOREIGN PATENT DOCUMENTS

| | | |
|---|---|---|
| WO | 02 091558 | 11/2002 |
| WO | 2009 040965 | 4/2009 |

* cited by examiner

CONTROL DEVICE FOR ROTARY MACHINE

TECHNICAL FIELD

The present invention relates to a control device for rotary machine, which can obtain the rotor position of a rotary machine without using a position sensor.

BACKGROUND ART

In order to accurately control a rotary machine having a rotor provided with a permanent magnet, such as a synchronous electric motor or an induction synchronous electric motor, information about the rotor position of the rotary machine and current flowing in the rotary machine is needed. The rotor position information is conventionally obtained by attaching a position sensor or the like on the rotary machine, but in view of cost reduction, space saving, and reliability improvement, a position sensorless method is being employed to obtain the rotor position information.

Examples of such a position sensorless control method for rotary machine are a position sensorless control method using induced voltage of a rotary machine as shown in Patent Document 1 and a position sensorless control method using saliency as shown in Patent Document 2. In the position sensorless control using induced voltage, when the speed is zero, the induced voltage is also zero, and therefore the rotor position cannot be estimated properly. In addition, in the position sensorless control using saliency, since the saliency used for rotor position estimation changes at two times the frequency of the rotor position, the frequency of the estimated position is also two times that of the rotor position. That is, the estimated position takes the same value between a range of 0 to 180 degrees and a range of 180 to 360 degrees of the rotor position of the rotary machine, and therefore this method is not sufficient for reliable detection of the rotor position.

Considering the above, at least when a rotary machine is started from a speed close to zero, besides the position sensorless control method using saliency, another method for estimating rotor position information about the rotary machine is needed. As such a method, for example, a method using magnetic saturation of the rotary machine as shown in Patent Document 3 is known.

In this method, 2n (n is a phase number and is a natural number equal to or greater than 3) voltage vectors having the same amplitude and having phases separated at equal intervals are applied to a rotary machine, and then a rotor position is detected from a summed current value obtained by summing detected values of currents flowing when a pair of such voltage vectors having phases different by 180 degrees from each other are applied. This method requires a precondition that the rotary machine becomes a magnetically saturated state by application of the voltage vectors.

For example, Patent Document 4 discloses an adjustment method for ensuring the magnetically saturated state. In this method, a pulse voltage value is gradually increased so that differential current ΔIb between the maximum value Imax of the H-level value of current when pulse voltage is applied, and the H-level value of current corresponding to pulse voltage having a phase different by 180 degrees from Imax, becomes equal to or greater than a predetermined value, thus adjusting the voltage pulse value automatically.

CITATION LIST

Patent Document

Patent Document 1: International Patent Publication No. WO2002/091558
Patent Document 2: International Patent Publication No. WO2009/040965
Patent Document 3: Japanese Patent No. 4271397
Patent Document 4: Japanese Laid-Open Patent Publication No. 2008-054430

SUMMARY OF THE INVENTION

Problems to be Solved by the Invention

In the case of using the rotor position detection method of Patent Document 3, as described above, it is necessary to apply sufficient current for magnetically saturating the rotary machine. This is for utilizing the following principle. That is, when magnetic saturation does not occur, current flowing when a voltage vector having a phase close to the rotor position is applied is equal to current flowing when a voltage vector having a phase different by 180 degrees from the phase close to the rotor position is applied, but on the other hand, when magnetic saturation occurs, the former becomes larger than the latter, and therefore the rotor position can be detected from the differential current therebetween.

Therefore, it is necessary to adjust an application time during which a voltage vector instruction is applied to the rotary machine, thereby adjusting the current flowing in the rotary machine. However, magnetic saturation of a rotary machine differs depending on the type, the capacity, or the like of the rotary machine. Therefore, in order to use the method of Patent Document 3, each rotary machine needs to be adjusted in advance by a person, thus causing very troublesome work. As a matter of course, it is conceivable that excessive current is applied so as to cause magnetic saturation more than sufficient, but this is not a good method because loss increases unnecessarily.

As one of solutions for the above problem, the aforementioned Patent Document 4 enables automatic adjustment. However, since the evaluation is performed by only using differential current, the state of magnetic saturation of the rotary machine cannot always be grasped sufficiently.

That is, in the case of using the current value in order to detect the degree of magnetic saturation as in Patent Document 4, it is difficult to distinguish whether, in the rotary machine, the differential current value increases due to magnetic saturation or the differential current value increases due to increase in the magnitude of the voltage vector instruction or the application time. Therefore, in the case where rotor position detection is performed using the voltage pulse value automatically adjusted by this method, there is a possibility that the accuracy of the detected rotor position might deteriorate or that excessive current might flow because a voltage pulse larger than necessary has been applied for detecting the rotor position.

The present invention has been made to solve the conventional problems as described above, and an object of the present invention is to obtain a control device for rotary machine, which enables more proper evaluation of the degree of magnetic saturation and enables simple and reliable detection setting of the minimum necessary application time setting value that allows estimation of the rotor position.

Means of Solution to the Problems

A control device for rotary machine according to the present invention is a control device for rotary machine, which controls the rotary machine having windings for n phases (n is a natural number equal to or greater than 3). The control device includes a voltage application section for applying a voltage vector based on a voltage vector instruction, to the rotary machine; a current detection section for detecting current flowing in the winding for each phase of the rotary machine; a voltage vector instruction calculation section for calculating, as the voltage vector instruction, 2n voltage vector instructions having the same amplitude, phases separated at equal intervals in one period (360 degrees), and the same application time, and outputting the 2n voltage vector instructions to the voltage application section; a storage section for storing, as stored current values, 2n×n currents detected for the respective phases by the current detection section when the 2n voltage vectors are applied, under the same condition thereamong; a position estimation section for estimating a rotor position of the rotary machine in a stopped state, based on the stored current values from the storage section; and an adjustment section for adjusting the application time to a minimum necessary application time Ta that allows the rotary machine to become a magnetically saturated state when the voltage vectors are applied, so as to enable the estimation of the rotor position. The adjustment section calculates an adjustment evaluation value based on the ratio between a voltage amplitude value of the voltage vector instructions and the stored current values from the current detection section in the case where the voltage vector based on the voltage vector instruction is applied with the application time being set to an arbitrary application time Tm, and adjusts the application time based on the adjustment evaluation value.

Effect of the Invention

As described above, a control device for rotary machine according to the present invention includes an adjustment section which calculates an adjustment evaluation value based on the ratio between a voltage amplitude value of the voltage vector instructions and the stored current values from the current detection section in the case where the voltage vector based on the voltage vector instruction is applied with the application time being set to an arbitrary application time Tm, and adjusts the application time based on the adjustment evaluation value. Therefore, the control device for rotary machine enables more proper evaluation of the degree of magnetic saturation and enables simple and reliable setting of the minimum necessary application time Ta of the voltage vector instruction that allows detection of the rotor position, whereby the rotor position can be detected stably and accurately.

EMBODIMENTS FOR CARRYING OUT THE INVENTION

Embodiment 1

Figure 1:
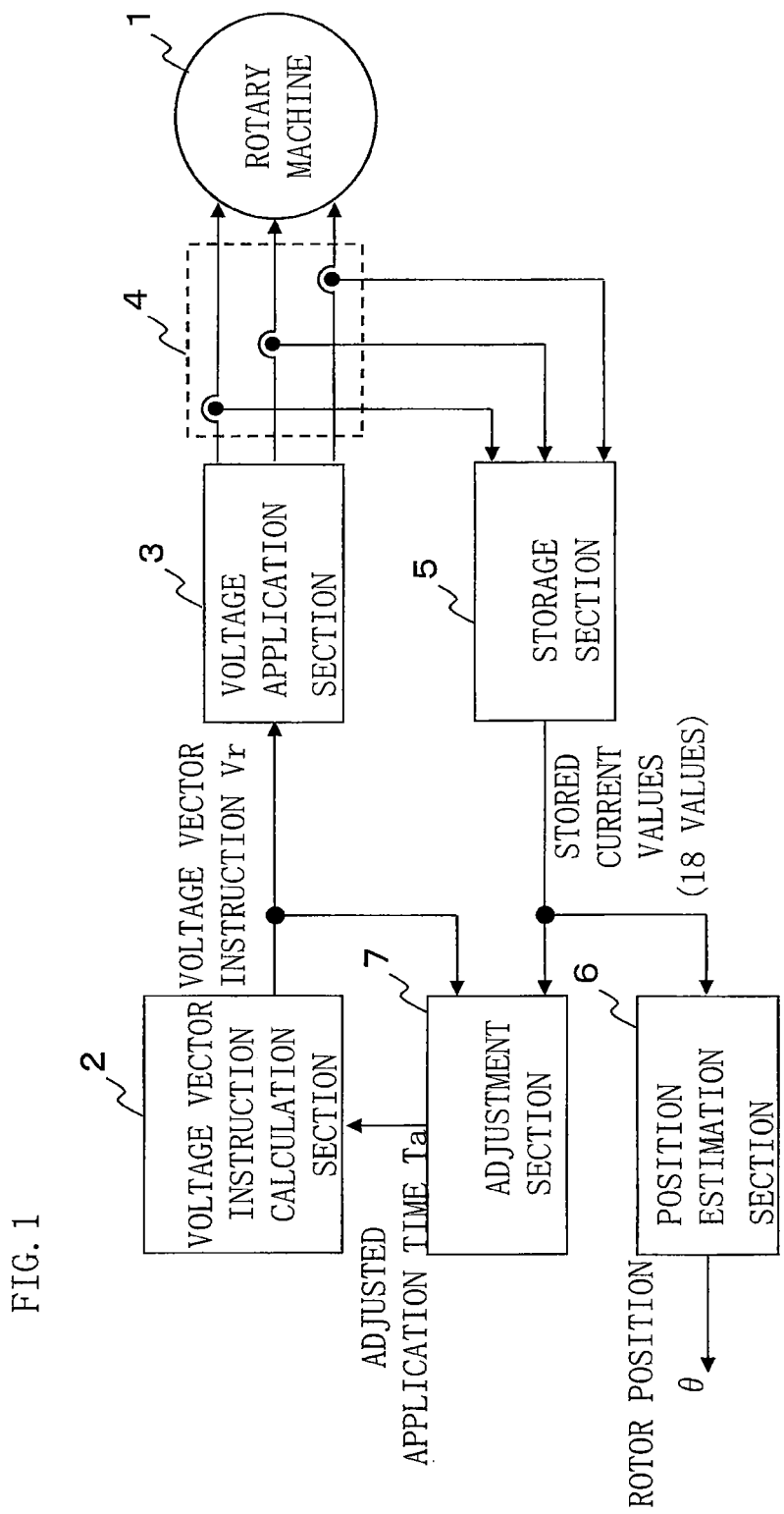
FIG. 1 is a diagram showing the configuration of a control device for rotary machine according to embodiment 1 of the present invention.

FIG. 1 is a configuration diagram of a control device for rotary machine according to embodiment 1 of the present invention. In FIG. 1, the rotary machine 1 has three-phase windings for U phase, V phase, and W phase, and here, is a permanent magnet rotary machine in which a permanent magnet is provided on a rotor. The rotary machine 1 is connected to a voltage application section 3 for applying voltage, such as an inverter. The voltage application section 3 applies a voltage vector based on a voltage vector instruction Vr inputted thereto, to the rotary machine 1. A current detection section 4 for detecting winding current flowing in the rotary machine 1 is connected between the voltage application section 3 and the rotary machine 1.

Figure 2:
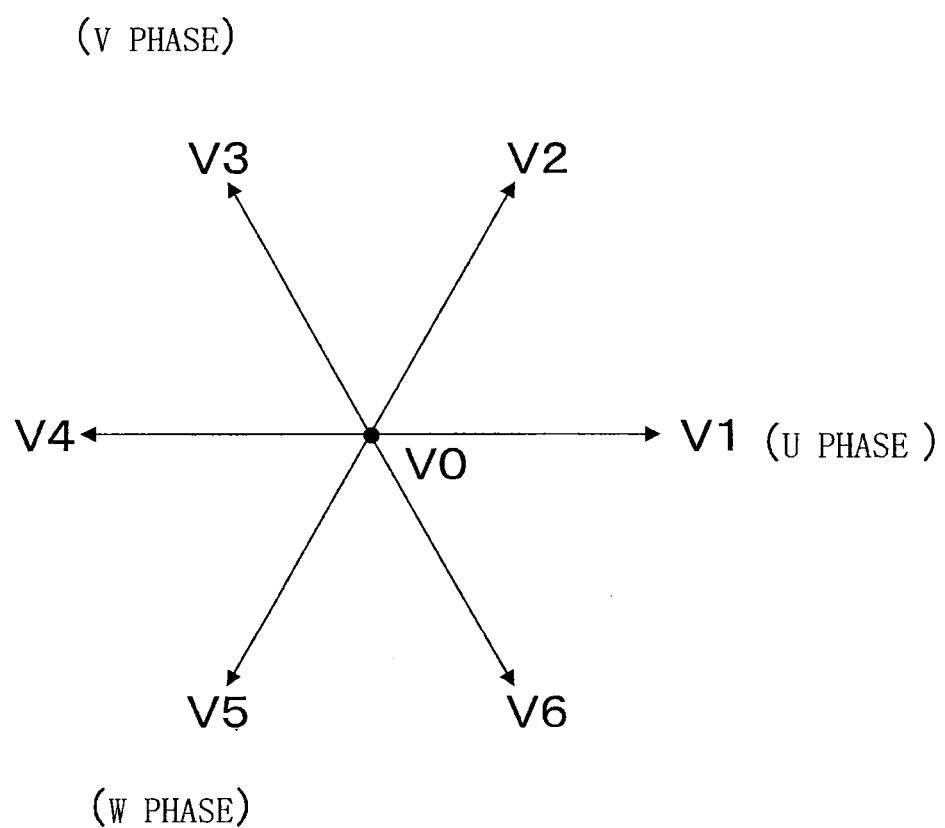
FIG. 2 is a vector diagram showing voltage vectors.
Figure 3:
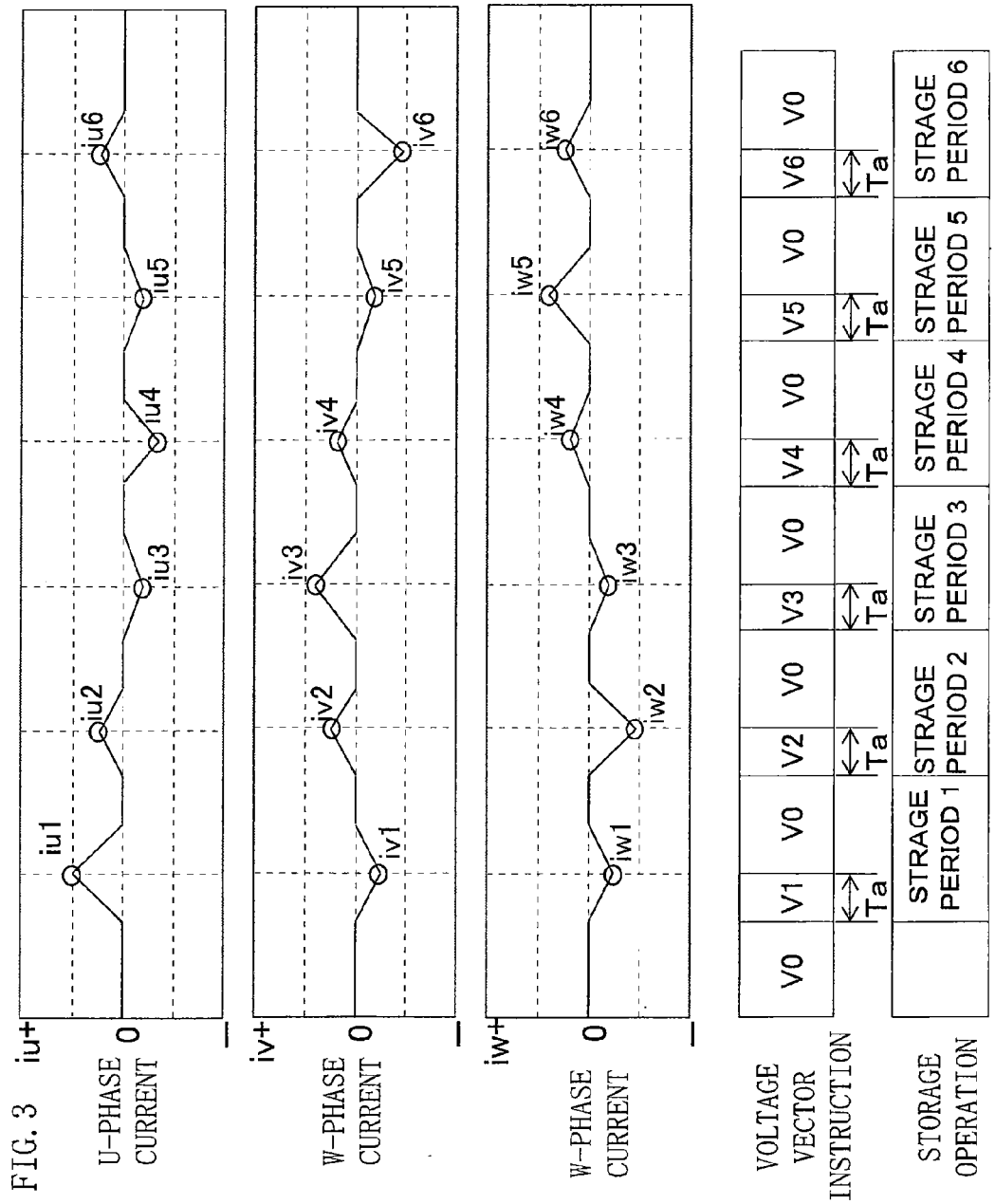
FIG. 3 is a timing chart showing the waveform of current flowing when each voltage vector is applied, and stored current values stored as the maximum value in each storage period.

A voltage vector instruction calculation section 2 sequentially applies voltage vector instructions V1 to V6 which are separated at 60-degree intervals as shown in FIG. 2, with a zero voltage vector instruction V0 being interposed therebetween, in the order, V0→V1→V0→V2→V0→V3→V0→V4→V0→V5→V0→V6→V0, as shown in FIG. 3. In addition, V1 to V6 are equal to each other in their magnitudes and application times, and are applied during an application time Ta set in advance.

It is noted that the voltage application section 3 outputs, based on the voltage vector instruction inputted from the voltage vector instruction calculation section 2, a voltage vector having the same waveform as that of the voltage vector instruction, to the rotary machine 1. Therefore, in the following description, the terms "voltage vector instruction" and "voltage vector" are used synonymously as appropriate unless they are particularly discriminated.

As shown by a storage operation in FIG. 3, a storage section 5 stores the maximum value of the absolute value of each of three-phase currents detected by the current detection section 4, in storage periods 1 to 6 which are a period during which the voltage vector instruction calculation section 2 outputs each of the voltage vector instructions V1 to V6 and the next voltage vector instruction V0, in other words, a period from the start of application of one voltage vector instruction (for example, V1) to the start of application of the next voltage vector instruction (for example, V2). Specifically, as shown in FIG. 3, in the storage period 1, the maximum value iu1 of the absolute value of the U-phase current, the maximum value iv1 of the absolute value of the V-phase current, and the maximum value iw1 of the absolute value of the W-phase current are stored. Also in the storage periods 2 to 6, similarly, iu2 to iu6, iv2 to iv6, and iw2 to iw6 are stored.

As a result, a total of 18 values (corresponding to 2n×n=18 in the case of phase number n=3) are stored as the stored current values.

A position estimation section 6 estimates the rotor position of the rotary machine 1 from the 18 stored current values outputted from the storage section 5. For this purpose, an output time (application time) Ta of the voltage vector instruction is set to a sufficient time for magnetically saturating a stator of the rotary machine 1, and a summed current value when the corresponding voltage vectors are applied to the rotary machine 1 is calculated. For example, as shown in expression (1), $\Delta iu$ is a summed current value obtained by summing: the U-phase stored current value iu1 having the same phase as the voltage vector V1 when the voltage vector V1 is applied; and the U-phase stored current value iu4 having the same phase as the voltage vector V4 when the voltage vector V4 having a phase different by 180 degrees from the phase of the voltage vector V1 is applied. At this time, $\Delta iu \neq 0$ is satisfied owing to the influence of magnetic saturation. It is noted that if the stator of the rotary machine 1 is not magnetically saturated, $\Delta iu = 0$ is satisfied.

$$\Delta iu = iu1 + iu4 \quad (1)$$

Similarly, where $\Delta iv$ is a summed current value obtained by summing the V-phase stored current value iv3 obtained when the voltage vector V3 is applied and the V-phase stored current value iv6 obtained when the voltage vector V6 having a phase different by 180 degrees from the phase of the voltage vector V3 is applied, $\Delta iv$ is represented by the following expression (2). In addition, where $\Delta iw$ is a summed current value obtained by summing the W-phase stored current value iw5 obtained when the voltage vector V5 is applied and the W-phase stored current value iw2 obtained when the voltage vector V2 having a phase different by 180 degrees from the phase of the voltage vector V5 is applied, $\Delta iw$ is represented by the following expression (3). When the rotary machine 1 is magnetically saturated, $\Delta iv \neq 0$ and $\Delta iw \neq 0$ are satisfied.

$$\Delta iv = iv3 + iv6 \quad (2)$$

$$\Delta iw = iw5 + iw2 \quad (3)$$

Figure 4:
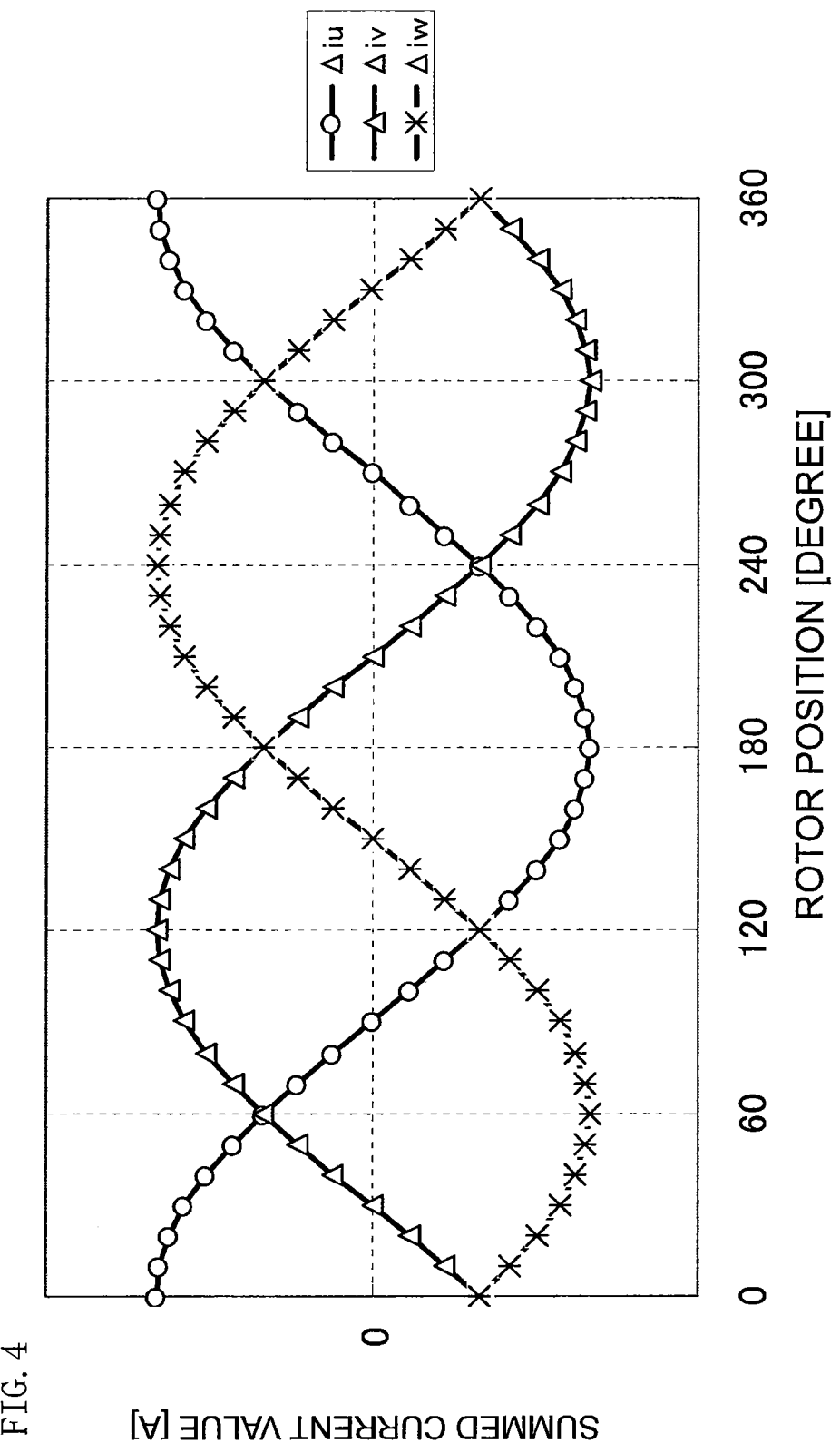
FIG. 4 is a diagram showing the relationship between summed current values $\Delta iu$, $\Delta iv$, and $\Delta iw$ and a rotor position.

FIG. 4 shows variations in the summed current values $\Delta iu$, $\Delta iv$, and $\Delta iw$ with respect to a rotor position $\theta$ of the rotary machine 1. The summed current values $\Delta iu$, $\Delta iv$, and $\Delta iw$ have characteristics that the magnitudes thereof vary in accordance with the rotor position $\theta$ of the rotary machine 1 with the same period as the rotor position $\theta$. In addition, the phase differences between the summed current values $\Delta iu$, $\Delta iv$, and $\Delta iw$ are each 120 degrees. The position estimation section 6 calculates the rotor position $\theta$ of the rotary machine 1 by using the summed current values $\Delta iu$, $\Delta iv$, and $\Delta iw$. A specific example of the calculation will be shown below.

As shown in FIG. 4, from the magnitudes of the absolute values of the summed current values $\Delta iu$, $\Delta iv$, and $\Delta iw$, the rotor position of the rotary machine 1 can be estimated with an accuracy of 60-degree interval. For example, when the rotor position $\theta$ is 0, $\Delta iu$ takes its maximum value and therefore the summed current value having the largest absolute value is $\Delta iu$. In addition, when the rotor position $\theta$ is 60 degrees, $\Delta iw$ takes its minimum value and therefore the summed current value having the largest absolute value is $\Delta iw$. Thus, the relationship between the absolute values of the summed current values $\Delta iu$, $\Delta iv$, and $\Delta iw$ and the rotor position $\theta$ is represented by the following expression (4), where m is an interval number when the range of rotor positions is divided into 60-degree intervals. Thus, the rotor position can be estimated with an accuracy of 60-degree interval.

Here, in order to accurately estimate the rotor position, it is necessary that the condition of expression (4) can be accurately determined, that is, the magnitude relationship among the summed current values $\Delta iu$, $\Delta iv$, and $\Delta iw$ in FIG. 4 can be accurately determined. For this purpose, it is necessary to set the application time Ta of the voltage vector instruction so that the stator of the rotary machine 1 will be magnetically saturated sufficiently.

Interval number m:Interval:MAX

1:−30~30 degrees:$\Delta iu$

2:30~90 degrees:$-\Delta iw$

3:90~150 degrees:$\Delta iv$

4:150~210 degrees:$-\Delta iu$

5:210~270 degrees:$\Delta iw$

6:270~330 degrees:$-\Delta iv$ \quad (4)

In addition, although not described in detail here, the estimation can be performed with an accuracy of 30-degree or 15-degree interval by using the method described in the aforementioned Patent Document 3. However, in this case, as well as the stored current value having the same phase as that of each voltage vector, a current value having a phase orthogonal to each voltage vector is needed. Therefore, all of the total of 18 stored current values described above are to be used in order to obtain these current values having orthogonal phases.

In order that the position estimation section 6 can accurately estimate the rotor position based on the stored current value outputted from the storage section 5 and the voltage vector instruction outputted from the voltage vector instruction calculation section 2, an adjustment section 7 automatically adjusts the application time Ta of the voltage vector instruction that allows the stator of the rotary machine 1 to be magnetically saturated sufficiently and does not allow current flowing in the rotary machine 1 to become excessively large. If the application time Ta of the voltage vector instruction that allows the stator of the rotary machine 1 to be magnetically saturated sufficiently and does not allow current flowing in the rotary machine 1 to become excessively large is adjusted through work by a person, the adjustment work requires a long time and is troublesome. Therefore, it is desirable that the application time Ta can be automatically adjusted.

Accordingly, considering that the rotor position estimation is performed based on the condition of expression (4) by using the summed current values of expressions (1) to (3) caused by magnetic saturation of the rotary machine 1 as described above, the degree of magnetic saturation of the rotary machine 1 may be detected to determine whether or not the rotary machine 1 is magnetically saturated sufficiently, and thereby the voltage vector application time that allows sufficient magnetic saturation may be automatically obtained. In the case of using, for example, the current value as in Patent Document 4 in order to detect the degree of magnetic saturation, it is difficult to distinguish whether, in the rotary machine 1, the summed current value increases due to magnetic saturation or the summed current value increases due to increase in the magnitude of the voltage vector instruction or the application time.

That is, since the magnitude of the summed current value is a function of two values, i.e., the degree of magnetic saturation of the rotary machine 1 and the voltage vector instruction, it is difficult to detect only the degree of magnetic saturation by only using the summed current value. In the case where the voltage vector application time is adjusted by only using the summed current value, there is a possibility that the voltage vector application time is adjusted to a value that does not allow the rotary machine 1 to be magnetically saturated sufficiently, or on the contrary, adjusted to a value that allows sufficient magnetic saturation but causes excessive current to flow in the rotary machine 1.

As a result, if the position estimation is performed by using the voltage vector application time adjusted by only using the summed current value, erroneous estimation of the position or deterioration of the estimation accuracy can occur, or excessive current can flow in the rotary machine 1. Therefore, the adjustment section 7 of the present embodiment 1 detects the degree of magnetic saturation by using two of the summed current value and the voltage vector instruction, thereby solving the above problem. Hereinafter, the specific method of the detection will be described.

First, a method for detecting the degree of magnetic saturation will be described. The summed current value Δiu in expression (1) is a value obtained by summing the stored current values iu1 and iu4 stored in the storage section 5, which are the values of currents flowing when the voltage vectors V1 and V4 having phases different by 180 degrees from each other are applied to the rotary machine 1. The impedance or the admittance of the rotary machine 1 is the same between positions where the phases are different by 180 degrees from each other. Therefore, iu1 and iu4 should have different signs and the same absolute value, and Δiu should be 0. However, if magnetic saturation occurs, iu1 and iu4 have different absolute values and Δiu is not 0.

That is, it can be considered that the reason for Δiu≠0 is because, by the magnetic saturation, a difference arises in the impedance or the admittance between positions where the phases are different by 180 degrees from each other in the rotary machine 1. Further, it can be considered that the difference in the impedances or the admittances arises due to only the magnetic saturation. Therefore, the impedances or the admittances at positions where the phases are different by 180 degrees from each other are calculated, and the degree of magnetic saturation of the rotary machine can be detected from the difference therebetween. The impedance or the admittance associated with the summed current values Δiu, Δiv, and Δiw in expressions (1) to (3) used for the position estimation is calculated as shown below.

Although in the present embodiment 1, the admittance associated with the summed current values Δiu, Δiv, and Δiw is calculated in a manner shown below, the following can be also applied to the case where the impedance which is a reciprocal of the admittance is calculated and utilized.

As described below, the admittance is calculated as a value obtained by dividing the stored current value by the voltage amplitude value of the voltage vector. On the other hand, the impedance is a reciprocal of the admittance, and is calculated as a value obtained by dividing the voltage amplitude value of the voltage vector by the stored current value. Therefore, considering that the degree of magnetic saturation can be detected by using the impedance or the admittance, it can be said that the ratio between the voltage amplitude value of the voltage vector and the stored current value can be used as an adjustment evaluation value and the degree of magnetic saturation can be evaluated based on this adjustment evaluation value.

The summed current value Δiu for U phase is a value obtained by summing the stored current values iu1 and iu4 stored in the storage section 5, which are the values of currents having the same phases as the voltage vectors V1 and V4, respectively, flowing when the voltage vectors V1 and V4 having phases different by 180 degrees from each other are applied to the rotary machine 1. Therefore, the admittance in the vector-V1 direction when the voltage vector instruction V1 is applied can be calculated from the voltage vector V1 and the stored current value iu1 as shown in expression (5). The calculated admittance is referred to as Yu1.

In addition, the admittance in the vector-V4 direction when the voltage vector instruction V4 is applied can be calculated from the voltage vector V4 and the stored current value iu4 as shown in expression (6). The calculated admittance is referred to as Yu4.

$$Yu1 = \left|\frac{iu1}{V1}\right| \quad (5)$$

$$Yu4 = \left|\frac{iu4}{V4}\right| \quad (6)$$

The difference between the admittances Yu1 and Yu4 can be calculated as the magnitude of the difference between Yu1 and Yu4 as shown in expression (7), for example. It is noted that the magnitude of the difference between Yu1 and Yu4 obtained by expression (7) is referred to as a U-phase differential admittance ΔYu.

$$\Delta Yu = |Yu1 - Yu4| \quad (7)$$

Similarly, the summed current value Δiv for V phase is a value obtained by summing the stored current values iv3 and iv6 stored in the storage section 5, which are the values of currents having the same phases as the voltage vectors V3 and V6, respectively, flowing when the voltage vectors V3 and V6 having phases different by 180 degrees from each other are applied to the rotary machine 1. Therefore, admittances Yv3 and Yv6 when the voltage vectors V3 and V6 are applied are represented by expressions (8) and (9), and further, a V-phase differential admittance ΔYv can be calculated as shown in expression (10).

$$Yv3 = \left|\frac{iv3}{V3}\right| \quad (8)$$

$$Yv6 = \left|\frac{iv6}{V6}\right| \quad (9)$$

$$\Delta Yv = |Yv3 - Yv6| \quad (10)$$

Similarly, the summed current value Δiw for W phase is a value obtained by summing the stored current values iw5 and iw2 stored in the storage section 5, which are the values of currents having the same phases as the voltage vectors V5 and V2, respectively, flowing when the voltage vectors V5 and V2 having phases different by 180 degrees from each other are applied to the rotary machine 1. Therefore, admittances Yw5 and Yw2 when the voltage vectors V5 and V2 are applied are represented by expressions (11) and (12), and further, a W-phase differential admittance ΔYw can be calculated as shown in expression (13).

$$Yw5 = \left|\frac{iw5}{V5}\right| \quad (11)$$

$$Yw2 = \left|\frac{iw2}{V2}\right| \quad (12)$$

$$\Delta Yw = |Yw5 - Yw2| \quad (13)$$

Figure 5:
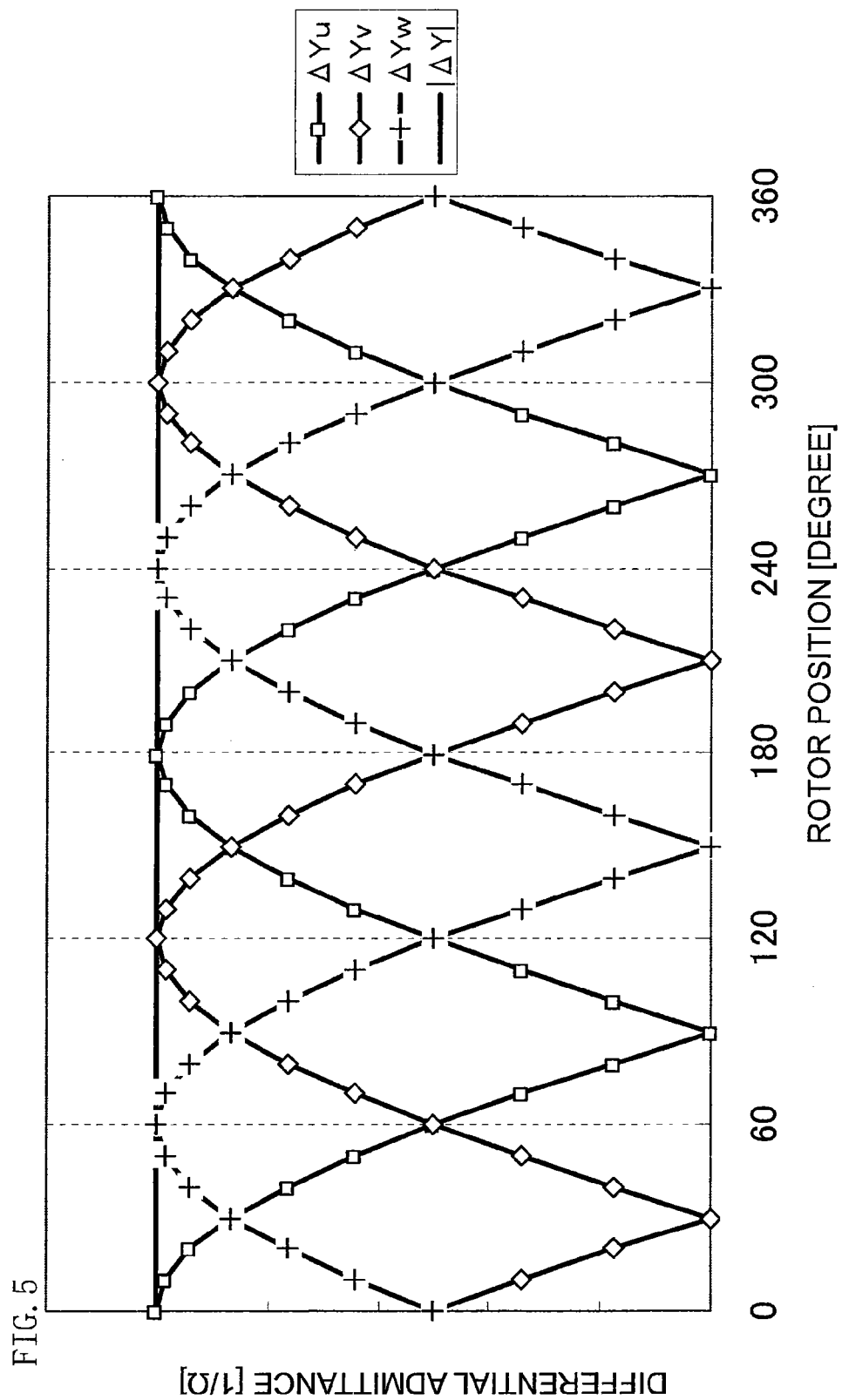
FIG. 5 is a diagram showing the relationship among differential admittances $\Delta Yu$, $\Delta Yv$, and $\Delta Yw$, $|\Delta Y|$, and the rotor position.

Since the magnitudes of the summed current values Δiu, Δiv, and Δiw vary in accordance with the rotor position θ of the rotary machine 1 as shown in FIG. 4, the differential admittances ΔYu, ΔYv, and ΔYw are represented as shown in FIG. 5.

Then, the magnitude |ΔY| of a vector quantity composed of the differential admittances ΔYu, ΔYv, and ΔYw is calculated by expression (14), whereby a constant value not depending on the rotor position θ can be obtained as shown in FIG. 5. Then, the magnitude |ΔY| of the differential admittances is used as an adjustment evaluation value for evaluating the degree of magnetic flux saturation, whereby the voltage vector application time Ta is to be adjusted.

$$|\Delta Y| = \sqrt{\frac{2}{3}(\Delta Yu^2 + \Delta Yv^2 + \Delta Yw^2)} \quad (14)$$

It is noted that since the voltage vector instructions V1 to V6 outputted from the voltage vector instruction calculation section 2 are equal to each other in their magnitudes and application times as described above, all the magnitudes |V1| to |V6| of the voltage vector instructions have the same value. Therefore, the differential admittances ΔYu, ΔYv, and ΔYw in expressions (7), (10), and (13) can be calculated by using the summed current values Δiu, Δiv, and Δiw as shown in expressions (15) to (17), where |V| is the magnitude of the voltage vector instruction.

$$\Delta Yu = |Yu1 - Yu4| \quad (15)$$
$$= \left\| \frac{iu1}{V} \right| - \left| \frac{iu4}{V} \right\|$$
$$= \frac{||iu1|-|iu4||}{|V|}$$
$$= \frac{|\Delta iu|}{|V|}$$

$$\Delta Yv = |Yv3 - Yv6| \quad (16)$$
$$= \left\| \frac{iv3}{V} \right| - \left| \frac{iv6}{V} \right\|$$
$$= \frac{||iv3|-|iv6||}{|V|}$$
$$= \frac{|\Delta iv|}{|V|}$$

$$\Delta Yw = |Yw5 - Yw2| \quad (17)$$
$$= \left\| \frac{iw5}{V} \right| - \left| \frac{iw2}{V} \right\|$$
$$= \frac{||iw5|-|iw2||}{|V|}$$
$$= \frac{|\Delta iw|}{|V|}$$

Figure 6:
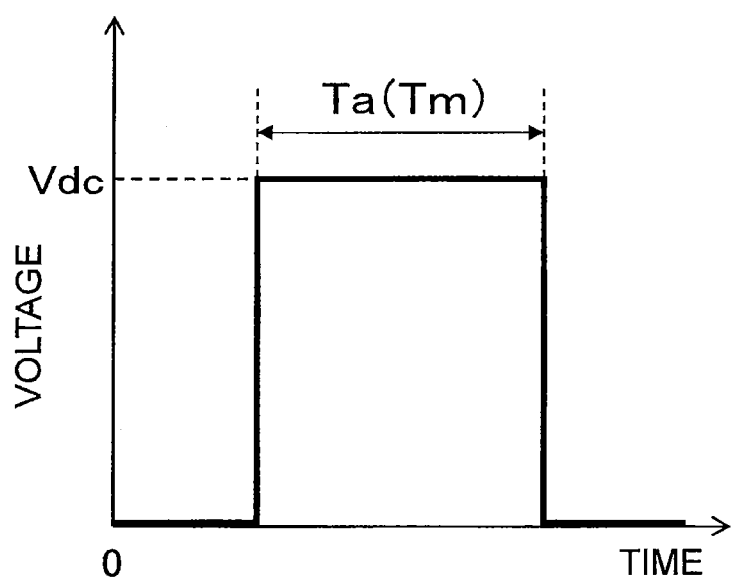
FIG. 6 is a diagram showing the waveform of a voltage vector instruction.

Further, in the case where, as in a voltage-type inverter or the like, the voltage application section 3 applies voltage to the rotary machine 1 by switching DC bus voltage having a fixed value, the applied voltage is a pulse voltage whose amplitude is the DC bus voltage Vdc and whose application time is the application time Ta of the voltage vector instruction as shown in FIG. 6. Therefore, as shown in expressions (18) to (20), the differential admittances ΔYu, ΔYv, and ΔYw can be calculated by using the application time Ta of the voltage vector instruction.

$$\Delta Yu = \left| \frac{|iu1|}{Vdc \cdot Ta} - \frac{|iu4|}{Vdc \cdot Ta} \right| = \frac{|\Delta iu|}{Vdc \cdot Ta} \quad (18)$$

$$\Delta Yv = \left| \frac{|iu3|}{Vdc \cdot Ta} - \frac{|iu6|}{Vdc \cdot Ta} \right| = \frac{|\Delta iv|}{Vdc \cdot Ta} \quad (19)$$

$$\Delta Yw = \left| \frac{|iu5|}{Vdc \cdot Ta} - \frac{|iu2|}{Vdc \cdot Ta} \right| = \frac{|\Delta iw|}{Vdc \cdot Ta} \quad (20)$$

Figure 7:
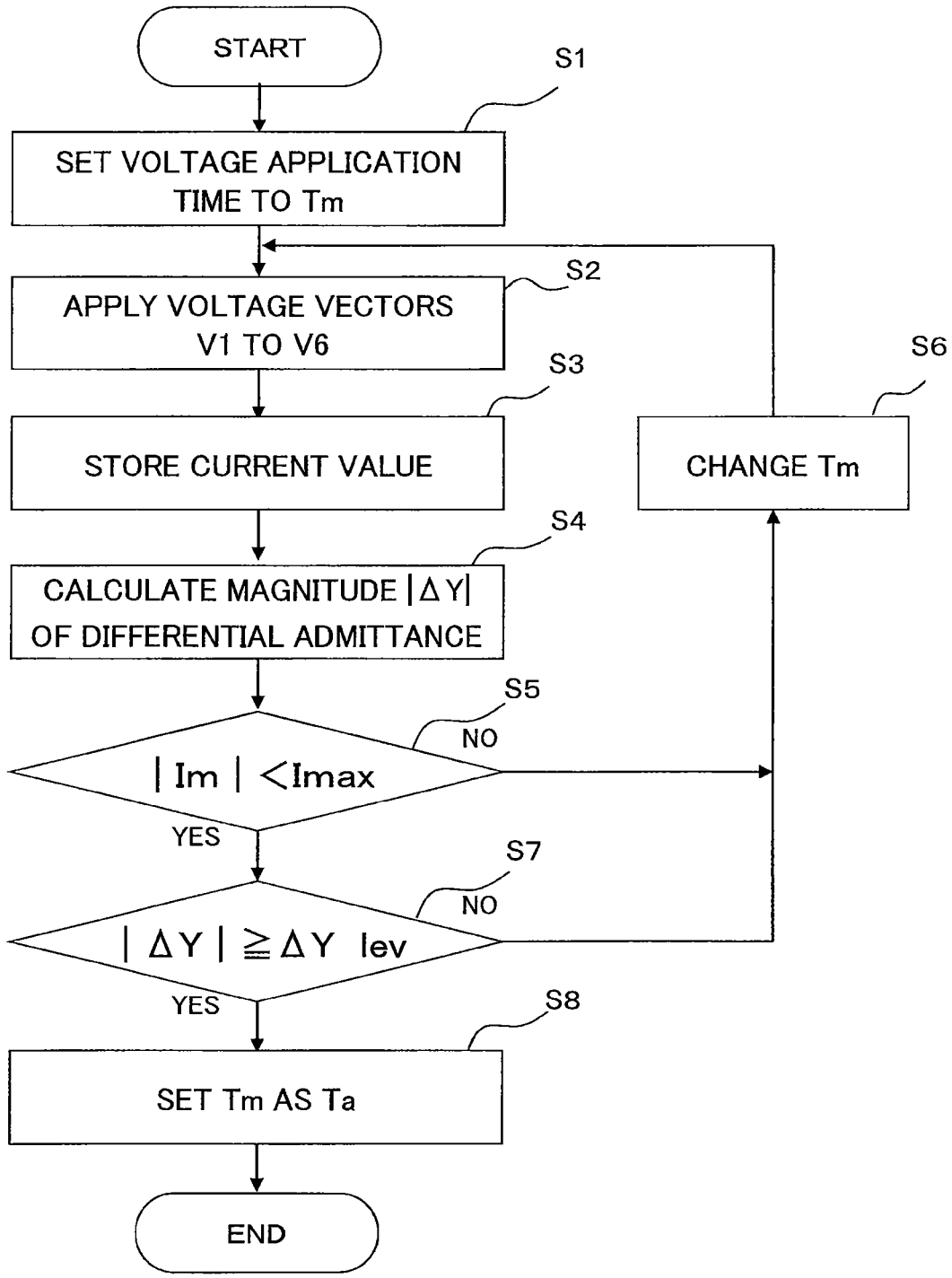
FIG. 7 is a flowchart showing operation for adjusting the application time of the voltage vector instruction.

Next, a method for automatically adjusting the application time Ta of the voltage vector instruction by using, as an adjustment evaluation value, the magnitude |ΔY| of the differential admittances ΔYu, ΔYv, and ΔYw indicating the degree of magnetic saturation, will be described with reference to a flowchart shown in FIG. 7.

First, the application time of the voltage vector instruction is set at an arbitrary value Tm (step S1), and then, similarly to estimation of the rotor position, the voltage vector instructions V1 to V6 which are separated at 60-degree intervals as shown in FIG. 2 are sequentially outputted, with the zero voltage vector instruction V0 being interposed therebetween, in the order, V0→V1→V0→V2→V0→V3→V0→V4→V0→V5→V0→V6→V0, as shown in FIG. 3 (step S2).

Similarly to estimation of the rotor position, as shown in the storage operation in FIG. 3, the storage section 5 stores the maximum value of the absolute value of each of three-phase currents detected by the current detection section 4, in the storage periods 1 to 6 which are a period during which the voltage vector instruction calculation section 2 outputs each of the voltage vector instructions V1 to V6 and the next voltage vector instruction V0 (step S3). The adjustment section 7 calculates the magnitude |ΔY| of the differential admittances from these stored current values stored in the storage section 5, as shown in expression (14) (step S4).

In addition, at this time, the adjustment section 7 calculates |Im| which is the greatest one of the absolute values of the 18 stored current values stored in the storage section 5, and determines whether or not the greatest current value |Im| is smaller than a predetermined current maximum value Imax (step S5). If the greatest current value |Im| is equal to or greater than the current maximum value Imax (NO in step S5), the application time Tm of the voltage vector instruction is changed (decreased) (step S6), and then the operation from step S2 is repeated. If the greatest current value |Im| is smaller than the current maximum value Imax (YES in step S5), whether or not the calculated magnitude |ΔY| of the differential admittances is equal to or greater than a differential admittance threshold value ΔYlev which is a predetermined adjustment threshold value, is determined (step S7).

If the magnitude |ΔY| of the differential admittance is equal to or greater than the differential admittance threshold value ΔYlev (YES in step S7), it can be considered that the stator of the rotary machine 1 is magnetically saturated sufficiently, and therefore the application time Tm of the voltage vector instruction at this time is set as Ta (step S8). Otherwise (NO in step S7), the application time Tm of the voltage vector instruction is changed, and then application of the voltage vector, calculation of the magnitude |ΔY| of the differential admittances, and comparison with the differential admittance threshold value ΔYlev are repeated.

It is desirable that in step S1, the initial value Tm of the application time is set to be comparatively small as appropriate so that the determination in step S7 in the first flow will be NO. Thus, the minimum necessary application time setting value Ta that allows estimation of the rotor position can be obtained almost certainly.

It is noted that the predetermined current maximum value Imax may be set to the rated current value or the maximum current value of the rotary machine 1, or the rated current value or the maximum current value of the voltage application section 3, for example. In addition, it is desirable that the predetermined differential admittance threshold value $\Delta$Ylev is set to the magnitude of the differential admittance that allows the position estimation section 6 to estimate the position accurately and does not allow current flowing in the rotary machine 1 to become excessively large. For example, if sufficient magnetic saturation occurs when the summed current value is 10% of the rated current value of the rotary machine 1, the differential admittance corresponding to the case where the summed current value is 10% of the rated current value may be set as the differential admittance threshold value $\Delta$Ylev.

As described above, in embodiment 1 of the present invention, the magnitude $|\Delta Y|$ of the differential admittance is calculated from the stored current values obtained when the voltage vector instructions V1 to V6 are each sequentially outputted for the application time Tm set at an arbitrary value, by using expression (14). Then, the calculated magnitude $|\Delta Y|$ of the differential admittance is compared with a predetermined differential admittance threshold value $\Delta$Ylev, and an arbitrary value of application time Tm of the voltage vector instruction set when $|\Delta Y| \geq \Delta$ Ylev is satisfied is set as the application time Ta of the voltage vector instruction. Thus, the degree of magnetic saturation can be estimated appropriately, and without work by a person, the position estimation section 6 can estimate the rotor position accurately, and the application time Ta of the voltage vector instruction can be automatically adjusted to a value that does not allow current flowing in the rotary machine 1 to become excessively large.

In the above description, the storage section 5 stores, as the stored current value, the maximum value of current for each phase detected by the current detection section 4 in each of the storage periods 1 to 6 when each voltage vector is applied, under the same condition thereamong. However, instead, when each voltage vector is applied, under the same condition thereamong, current for each phase detected by the current detection section 4 at an end timing of each application may be stored as the stored current value. Also in this case, almost the same stored current value as in the above case can be obtained, and in addition, since it is sufficient that the detection value is extracted and stored with reference to only a timing, there is an advantage that the configuration of the storage section is simplified.

Embodiment 2

In the above embodiment 1, for adjustment of the application time Ta of the voltage vector instruction, the application time of the voltage vector instruction is set at an arbitrary value Tm, and the value of Tm is changed as appropriate, whereby the minimum necessary application time setting value Ta that allows estimation of the rotor position is obtained. On the other hand, the present embodiment 2 is intended to, by gradually increasing the application time of the voltage vector instruction from a value close to zero upon the setting, make it possible to calculate the application time Ta of the voltage vector instruction while reducing a time needed for automatic adjustment and making current flowing in the rotary machine 1 as small as possible.

The configuration of the present embodiment 2 is the same as in embodiment 1 shown in FIG. 1, and matters such as the way of calculating the magnitude of the differential admittance are also the same. Only the setting method for the application time Tm of the voltage vector instruction and the subsequent processing are different. Therefore, the description of the same matters as in embodiment 1 is omitted.

Figure 8:
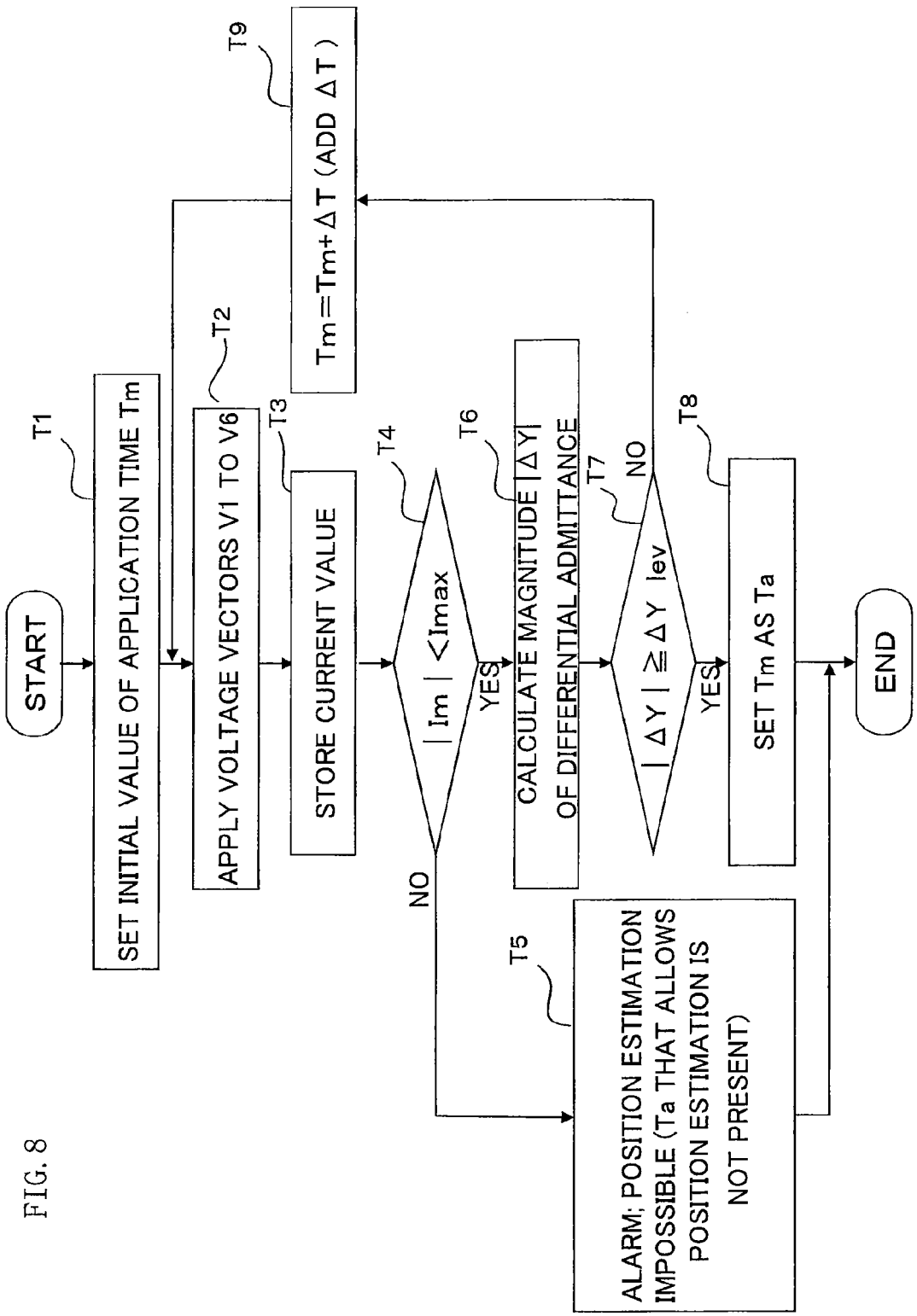
FIG. 8 is a flowchart showing operation for adjusting the application time of the voltage vector instruction in a control device for rotary machine according to embodiment 2 of the present invention.

FIG. 8 is a flowchart showing operation for automatically adjusting the application time of the voltage vector instruction according to the present embodiment 2.

First, the initial value of the application time Tm of the voltage vector instruction is set (step T1). The initial value is set at a small value close to zero. Then, the voltage vector instructions V1 to V6 which are separated at 60-degree intervals as shown in FIG. 2 are sequentially outputted, with the zero voltage vector instruction V0 being interposed therebetween, in the order, V0→V1→V0→V2→V0→V3→V0→V4→V0→V5→V0→V6→V0, as shown in FIG. 3 (step T2).

As shown in the storage operation in FIG. 3, the storage section 5 stores the maximum value of the absolute value of each of three-phase currents detected by the current detection section 4, in the storage periods 1 to 6 which are a period during which the voltage vector instruction calculation section 2 outputs each of the voltage vector instructions V1 to V6 and the next voltage vector instruction V0 (step T3). The adjustment section 7 calculates |Im| which is the greatest one of the absolute values of the 18 stored current values stored in the storage section 5, and determines whether or not the greatest current value |Im| is smaller than a predetermined current maximum value Imax (step T4).

At this time, if the greatest current value |Im| is equal to or greater than the current maximum value Imax (NO in step T4), it is determined that there is no such an application time of the voltage vector instruction that allows preferable position estimation with a current value smaller than the current maximum value Imax, and alarm processing for indicating that the position estimation is impossible is performed (step T5). If the greatest current value |Im| is smaller than the current maximum value Imax (YES in step T4), the adjustment section 7 calculates the magnitude $|\Delta Y|$ of the differential admittance from the stored current values stored in the storage section 5 as shown in expression (14) (step T6).

Then, whether or not the calculated magnitude $|\Delta Y|$ of the differential admittance is equal to or greater than a predetermined differential admittance threshold value $\Delta$Ylev, is determined (step T7). If the magnitude $|\Delta Y|$ of the differential admittance is equal to or greater than the differential admittance threshold value $\Delta$Ylev (YES in step T7), it is considered that the stator of the rotary machine 1 is magnetically saturated sufficiently, and therefore the application time Tm of the voltage vector instruction at this time is set as Ta (step T8). Otherwise (NO in step T7), a voltage application time adding value $\Delta$T is added to the application time Tm of the voltage vector instruction, to change the application time Tm of the voltage vector instruction (step T9), and then application of the voltage vector, calculation of the magnitude $|\Delta Y|$ of the differential admittance, and comparison with the differential admittance threshold value $\Delta$Ylev are repeated.

As described above, in embodiment 2 of the present invention, the initial value of the application time Tm of the voltage vector instruction to be set arbitrarily is set at a value close to zero, and the magnitude $|\Delta Y|$ of the differential admittance is calculated from the stored current values obtained when the voltage vector instructions V1 to V6 are each sequentially outputted for the set application time Tm, by using expression (14). Then, while the calculated $|\Delta Y|$ is compared with a predetermined differential admittance threshold value ΔYlev, the setting value of the application time Tm is sequentially increased by ΔT until |ΔY|≥ΔYlev is satisfied. Then, the application time Tm of the voltage vector instruction set when |ΔY|≥ΔYlev is satisfied is set as the application time Ta of the voltage vector instruction. Thus, the degree of magnetic saturation can be estimated appropriately, and without work by a person, the position estimation section 6 can estimate the rotor position accurately, and the application time Ta of the voltage vector instruction can be automatically adjusted to a value that does not allow current flowing in the rotary machine 1 to become excessively large.

Further, |Im| which is the greatest one of the absolute values of the 18 stored current values stored in the storage section 5 is calculated, and whether or not |Im| is smaller than the current maximum value Imax is determined, whereby alarm processing for indicating that the position estimation is impossible can be also performed.

In the above description, as shown in FIG. 8, a small value that certainly does not cause magnetic saturation, i.e., a value close to zero is set as the initial value of the application time Tm, and the application time Tm to be set is sequentially increased by ΔT until it is determined that |ΔY|≥ΔYlev is satisfied. However, instead, a great value that certainly causes magnetic saturation may be set as the initial value of the application time Tm, and the setting value of the application time Tm may be sequentially decreased by ΔT until |ΔY|<ΔYlev is satisfied. Then, a value obtained by adding ΔT to the application time Tm set when |ΔY|<ΔYlev is satisfied may be set as the application time Ta of the voltage vector instruction. Also in this case, by appropriately setting the initial value of the application time Tm, the same effect as in the case of FIG. 8 can be obtained efficiently.

Embodiment 3

It is desirable that the predetermined differential admittance threshold value ΔYlev of the above embodiment 1 or 2 is set to the magnitude of the differential admittance that allows the position estimation section 6 to estimate the position accurately and does not allow current flowing in the rotary machine 1 to become excessively large. Therefore, for example, if sufficient magnetic saturation occurs when the summed current value is 10% of the rated current value of the rotary machine 1, the differential admittance corresponding to the case where the summed current value is 10% of the rated current value is set as the differential admittance threshold value ΔYlev. Such a differential admittance threshold value ΔYlev can change depending on the type or the capacity of the rotary machine 1.

Therefore, in the case where, for example, the differential admittance threshold value ΔYlev is set with reference to the rated current value of the rotary machine 1, and the position estimation for the rotor is performed by using the application time Ta adjusted based on the set differential admittance threshold value ΔYlev, there is a possibility that the position estimation accuracy is deteriorated. Accordingly, in the present embodiment 3, the setting method for the differential admittance threshold value will be described, assuming that the setting method is applied to rotary machines of various types or with various capacities.

The contents other than matters of how to set the differential admittance threshold value ΔYlev are the same as in the above embodiments 1 and 2, and therefore the description thereof is omitted.

In the case where the voltage application section 3 is a voltage-type inverter, as described above, the voltage vector outputted from the voltage application section 3 is a voltage pulse as shown in FIG. 6. In the case where the rotary machine 1 is a synchronous machine, the impedance of the rotary machine is R+sL (R: winding resistance, L: inductance, s: Laplace operator). If the voltage pulse in FIG. 6 is regarded as step voltage, current Is(s) flowing in the rotary machine 1 at this time can be represented by expression (21).

$$Is(s) = \frac{1}{R+sL} \frac{Vdc}{s} \quad (21)$$

Figure 9:
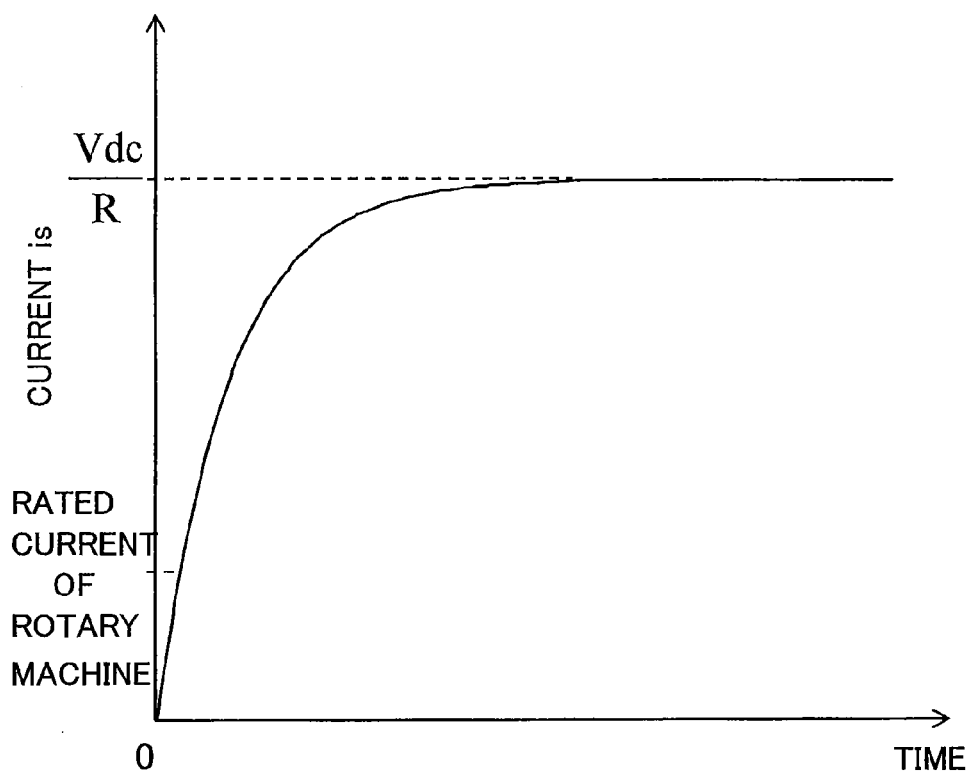
FIG. 9 is a timing chart showing the waveform of current is(t) flowing when step voltage with an amplitude Vdc is applied to a rotary machine, in the description of a control device for rotary machine according to embodiment 3 of the present invention.

If expression (21) is converted into time domain by inverse Laplace transform, expression (22) is obtained. FIG. 9 shows a graph of expression (22).

$$is(t) = \frac{Vdc}{R}\left(1 - \exp\left(-\frac{R}{L}t\right)\right) \quad (22)$$

As shown in expression (22), the final value of current is(t) in the case where step voltage with an amplitude Vdc is given is a value obtained when a time t is set to infinity, that is, Vdc/R. However, in the case of general rotary machine, the final value Vdc/R is sufficiently greater than the rated current of the rotary machine. In addition, the voltage vector outputted from the voltage application section 3 is not step voltage but pulse voltage with the application time Tm, in which current flowing in the rotary machine 1 is sufficiently smaller than Vdc/R. Therefore, current flowing in the rotary machine 1 when pulse voltage as shown in FIG. 6 is applied can be approximated into a straight line with its slope being a differential value at the origin (time 0) as shown by expression (23).

$$is(t) = \frac{d}{dt}(is(0)) \cdot t = \frac{Vdc}{L}t \quad (23)$$

Therefore, by substituting the application time Tm of the voltage vector into t in expression (23), the value of current flowing in the rotary machine 1 when the voltage vector with the application time Tm is applied can be calculated as shown by expression (24).

$$is = \frac{Vdc}{L}Tm \quad (24)$$

Since the value of current flowing in the rotary machine 1 can be calculated as shown by expression (24), the magnitude of the U-phase stored current value iu1 to be stored in the storage section 5 when the voltage vector V1 is applied is represented by expression (25).

$$|iu1| = \frac{Vdc}{Lu1}Tm \quad (25)$$

(where Lu1 is inductance in V1 direction)

Similarly, the magnitudes of the stored current values iu4, iv3, iv6, iw5, and iw2 are calculated as shown by expressions (26) to (30), respectively.

$$|iu4| = \frac{Vdc}{Lu4}Tm \quad (26)$$

(where Lu4 is inductance in V4 direction)

$$|iv3| = \frac{Vdc}{Lv3}Tm \quad (27)$$

(where Lv3 is inductance in V3 direction)

$$|iv6| = \frac{Vdc}{Lv6}Tm \quad (28)$$

(where Lv6 is inductance in V6 direction)

$$|iw5| = \frac{Vdc}{Lw5}Tm \quad (29)$$

(where Lw5 is inductance in V5 direction)

$$|iw2| = \frac{Vdc}{Lw2}Tm \quad (30)$$

(where Lw2 is inductance in V2 direction)

Since the stored current values iu1, iu4, iv3, iv6, iw5, and iw2 are represented by expressions (25) to (30), in the case where the application time of the voltage vector instruction is Tm, the differential admittances calculated by expressions (18) to (20) are represented by expressions (31) to (33) by substituting expressions (25) to (30) into expressions (18) to (20) in which Ta is replaced with Tm. Here, the meaning of expressions (31) to (33) is to calculate the difference between reciprocals of the inductances caused by magnetic saturation at positions where the phases are different by 180 degrees from each other in the rotary machine 1.

$$\Delta Yu = \left| \frac{|iu1|}{Vdc \cdot Tm} - \frac{|iu4|}{Vdc \cdot Tm} \right| = \left| \frac{1}{Lu1} - \frac{1}{Lu4} \right| \quad (31)$$

$$\Delta Yv = \left| \frac{|iv3|}{Vdc \cdot Tm} - \frac{|iv5|}{Vdc \cdot Tm} \right| = \left| \frac{1}{Lv3} - \frac{1}{Lv6} \right| \quad (32)$$

$$\Delta Yw = \left| \frac{|iw5|}{Vdc \cdot Tm} - \frac{|iw2|}{Vdc \cdot Tm} \right| = \left| \frac{1}{Lw5} - \frac{1}{Lw2} \right| \quad (33)$$

Since the differential admittance is calculated as the difference between reciprocals of the inductances, if the differential admittance threshold value ΔYlev is set at a value obtained as a function of a reciprocal of the inductance of the rotary machine 1 itself, the differential admittance threshold value ΔYlev also changes by itself along with change in the type or the capacity of the rotary machine. Thus, it becomes possible to adjust the application time Ta of the voltage vector instruction irrespective of the type or the capacity of the rotary machine.

Specifically, in the case where the inductance of the rotary machine 1 is Lm, the differential admittance threshold value ΔYlev is set at a value obtained as a function of 1/Lm which is a reciprocal of the inductance Lm of the rotary machine 1, for example, a proportion of 1/Lm such as 5% or 10% of 1/Lm. Thereafter, the application time Ta of the voltage vector instruction is automatically adjusted by the same procedure as in embodiment 1 or embodiment 2.

As described above, in embodiment 3 of the present invention, the differential admittance threshold value ΔYlev to be set in the adjustment section 7 is set at a value obtained as a function of a reciprocal of the inductance Lm of the rotary machine 1, for example, a value obtained by multiplying the reciprocal by a coefficient. Thus, irrespective of the type or the capacity of the rotary machine 1, the degree of magnetic saturation can be estimated appropriately, and without work by a person, the position estimation section 6 can estimate the rotor position accurately, and the application time Ta of the voltage vector instruction can be automatically adjusted to a value that does not allow current flowing in the rotary machine 1 to become excessively large.

The invention claimed is:

1. A control device for rotary machine, which controls a rotary machine having windings for n phases (n is a natural number equal to or greater than 3), the control device comprising:
a voltage application section for applying a voltage vector based on a voltage vector instruction, to the rotary machine;
a current detection section for detecting current flowing in the winding for each phase of the rotary machine;
a voltage vector instruction calculation section for calculating, as the voltage vector instruction, 2n voltage vector instructions having the same amplitude, phases separated at equal intervals in one period (360 degrees), and the same application time, and outputting the 2n voltage vector instructions to the voltage application section;
a storage section for storing, as stored current values, 2n×n currents detected for the respective phases by the current detection section when the 2n voltage vectors are applied, under the same condition thereamong;
a position estimation section for estimating a rotor position of the rotary machine in a stopped state, based on the stored current values from the storage section; and
an adjustment section for adjusting the application time to a minimum necessary application time Ta that allows the rotary machine to become a magnetically saturated state when the voltage vectors are applied, so as to enable the estimation of the rotor position,
wherein the adjustment section calculates an adjustment evaluation value based on the ratio between a voltage amplitude value of the voltage vector instructions and the stored current values from the current detection section in the case where the voltage vector based on the voltage vector instruction is applied with the application time being set to an arbitrary application time Tm, and adjusts the application time based on the adjustment evaluation value.

2. The control device for rotary machine according to claim 1, wherein the adjustment section sets, as the application time Ta, the application time Tm that causes the adjustment evaluation value to become the minimum, in a range greater than a predetermined adjustment threshold value.

3. The control device for rotary machine according to claim 2, wherein the adjustment section
sets an initial value of the application time Tm at a small value that certainly does not cause the magnetic saturation, to calculate the adjustment evaluation value, and determines the magnitude relationship between the adjustment evaluation value and the adjustment threshold value, repeats the determination operation while sequentially increasing the application time Tm by a time ΔT, and sets, as the application time Ta, the application time Tm corresponding to when a result of the determination satisfies (the adjustment evaluation value>the adjustment threshold value) for the first time.

4. The control device for rotary machine according to claim 2, wherein the adjustment section sets an initial value of the application time Tm at a great value that certainly causes the magnetic saturation, to calculate the adjustment evaluation value, and determines the magnitude relationship between the adjustment evaluation value and the adjustment threshold value, repeats the determination operation while sequentially decreasing the application time Tm by a time ΔT, and sets, as the application time Ta, a value obtained by adding the time ΔT to the application time Tm corresponding to when a result of the determination satisfies (the adjustment evaluation value<the adjustment threshold value) for the first time.

5. The control device for rotary machine according to claim 1, wherein the adjustment section calculates the greatest current value which is the greatest one of the stored current values, and performs the adjustment operation under the condition that the greatest current value is smaller than a predetermined current maximum value.

6. The control device for rotary machine according to claim 1, wherein the storage section stores, as the stored current value, the maximum value of current detected during a storage period from the start of application of each voltage vector instruction to the start of application of the next voltage vector instruction.

7. The control device for rotary machine according to claim 1, wherein the storage section stores, as the stored current value, the value of current detected at the end of application of each voltage vector instruction.

8. The control device for rotary machine according to claim 1, wherein the position estimation section sums, among the stored current values stored in the storage section, the values of currents detected when a pair of the voltage vectors having phases different by 180 degrees from each other are applied, and having the same phases as the pair of voltage vectors, thereby calculating n summed current values, and estimates the rotor position of the rotary machine in a stopped state, based on the n summed current values.

9. The control device for rotary machine according to claim 8, wherein the adjustment section divides the n summed current values by the voltage amplitude value of the voltage vector based on the voltage vector instruction, thereby calculating n differential admittances, and uses, as the adjustment evaluation value, the magnitude of a vector quantity composed of the n differential admittances.

10. The control device for rotary machine according to claim 8, wherein the adjustment section divides the n summed current values by (the voltage amplitude value)×(the application time) of the voltage vector based on the voltage vector instruction, thereby calculating n differential admittances, and uses, as the adjustment evaluation value, the magnitude of a vector quantity composed of the n differential admittances.

11. The control device for rotary machine according to claim 10, wherein the adjustment section uses, as the adjustment threshold value, a value obtained as a function of a reciprocal of the inductance of the rotary machine.

* * * * *